(12) United States Patent
Wang et al.

(10) Patent No.: US 6,247,075 B1
(45) Date of Patent: Jun. 12, 2001

(54) MOUSE INTERFACE CONVERTER FOR CONNECTING MOUSE TO COMPUTERS WITH DIFFERENT TYPES OF CONNECTING PORTS

(75) Inventors: Han-Che Wang; Wen-Pin Chou, both of Taipei; Tzu-Chiang Shih, Taipei Hsien, all of (TW)

(73) Assignee: Primax Electronics Ltd., Taipei Hsien (TW)

( * ) Notice: Subject to any disclaimer, the term of this patent is extended or adjusted under 35 U.S.C. 154(b) by 0 days.

(21) Appl. No.: 09/172,336

(22) Filed: Oct. 14, 1998

(30) Foreign Application Priority Data

Jun. 24, 1998 (TW) ................................. 87210093

(51) Int. Cl.[7] .............................. G06F 13/00; G06F 1/26; G06F 1/18; G06F 3/033; G08C 21/00
(52) U.S. Cl. .............................. 710/63; 710/62; 710/127; 710/126; 710/129; 710/64; 710/72; 713/300; 345/157; 361/601
(58) Field of Search ................................ 710/63, 127, 62, 710/129, 5, 72, 64; 178/18; 713/300; 345/157; 361/601

(56) References Cited

U.S. PATENT DOCUMENTS

| 4,716,527 | * | 12/1987 | Graciotti | 710/127 |
| 4,886,941 | * | 12/1989 | Davis et al. | 178/18 |
| 5,428,367 | * | 6/1995 | Mikan | 345/157 |
| 5,754,890 | * | 5/1998 | Holmdahl et al. | 710/63 |
| 5,920,734 | * | 7/1999 | Holmdahl | 361/601 |
| 5,935,224 | * | 8/1999 | Svancarek et al. | 710/63 |
| 5,991,546 | * | 11/1999 | Chan et al. | 710/62 |
| 6,049,881 | * | 4/2000 | Massman et al. | 713/300 |

FOREIGN PATENT DOCUMENTS

| 63153690A | * | 6/1988 | (JP) | G06K/17/00 |
| 07056833A | * | 3/1995 | (JP) | G06F/13/00 |
| 09152937A | * | 6/1997 | (JP) | G06F/3/033 |

OTHER PUBLICATIONS

Severance "Linking Computers and Consumer Electronics", Computer, V. 30, Issue 2, Feb. 1997, pp. 119–121.*

Ford et al. "AWING: A General Purpose Command Interface Generator (and an Exercise in Software Reuse)", The First Symposium on Environments & Tools for Ada, 1991, pp. 73–82.*

* cited by examiner

Primary Examiner—Thomas Lee
Assistant Examiner—Katharina Schuster
(74) Attorney, Agent, or Firm—Jiawei Huang; J.C. Patents (57) ABSTRACT

A mouse interface converter is provided, which allows a mouse to be connectable to a computer system, such as a personal computer (PC), installed with either an RS-232 serial port or a PS/2 port. This mouse interface converter allows the mouse to be connected directly to PS/2 port and via an adapter to RS-232 serial port. The mouse interface converter includes a mode-detection circuit for detecting which type of port the mouse is currently being connected. The mode-detection circuit can generate a mode-indicating signal indicative of the type of the currently connected port, which is then used to set a control circuit to convert the mouse data to the corresponding format. The mouse interface converter further includes a driving circuit that allows the mouse to be more compatible with various signals of either the PS/2 port or the RS-232 serial port. This feature allows the mouse to be considerably reduced in power consumption that allows the mouse to be suitable for use on notebook computers.

13 Claims, 4 Drawing Sheets

MOUSE INTERFACE CONVERTER FOR CONNECTING MOUSE TO COMPUTERS WITH DIFFERENT TYPES OF CONNECTING PORTS

CROSS-REFERENCE TO RELATED APPLICATION

This application claims the priority benefit of Taiwan application serial no. 87210093, filed Jun. 24, 1998, the full disclosure of which is incorporated herein by reference.

BACKGROUND OF THE INVENTION

1. Field of the Invention

This invention relates to a mouse interface converter, and more particularly, to a mouse interface converter that allows a mouse (pointing device) to be connectable to a computer system, such as a personal computer (PC), installed with either an RS-232 serial port or a PS/2 port.

2. Description of Related Art

Modem computers typically utilize a graphic-based operating environment, called graphical user interface (GUI), for the user to operate the computer in a very user-friendly manner with a point device, such as a mouse or the like. The user can select and activate options simply by pointing and clicking with the mouse. With the earlier technology, a mouse is connected to a PC via a dedicated interface card. One drawback to the use of the dedicated interface card is that it is quite laborious to install in the PC and requires additional power supply to operate. Newer technology allows the mouse to be connected to the PC via the standard RS-232 serial port without the need of additional power supply. However, a single PC unit typically comes with only two RS-232 serial ports, and typically the total number of external devices that need to be connected via RS-232 serial ports to the PC is often more than two. These external devices include, for example, a MODEM (abbreviation for modulator-demodulator, which is used to connect the PC to a network, such as INTERNET) and an infrared transmitter. Therefore, with the addition of a mouse that also requires the RS-232 serial port for connection to the PC, the user may be frequently involved in repeated unplugging and plugging of the various devices to the PC, which is, needless to say, very laborious and inconvenient.

Moreover, on portable computers, such as notebook computers, a new interface called PS/2 interface is provided for the computer to connect a mouse thereto. The PS/2 interface is now also standard on some newer models of desktop PCs.

The RS-232 interface and the PS/2 interface are distinctively different in specifications. Presently, most mouse devices on the market can be connected to one type of port only, either the RS-232 serial port or the PS/2 port, but not both. Therefore, when purchasing a new mouse, the user must know which type of port his/her PC comes with, and then purchase the mouse that is specifically designed to be connectable to that type of port; otherwise, if a wrong type of mouse is purchased, it would not be able to operate properly. Ordinary users, however, are typically unaware of such distinctions. Moreover, not all PCs come with both the RS-232 serial port and the PS/2 port together on the same unit, typically with one of them only. A PC with the RS-232 serial port will be unable to use a PS/2-compliant mouse; and similarly, a PC with the PS/2 port will be unable to use an RS-232-compliant mouse. There exists, therefore, a need in the PC market for means that allows a mouse to be connectable to a PC installed with either an RS-232 serial port or a PS/2 port. One solution to this need is to use an adapter.

Figure 1A:
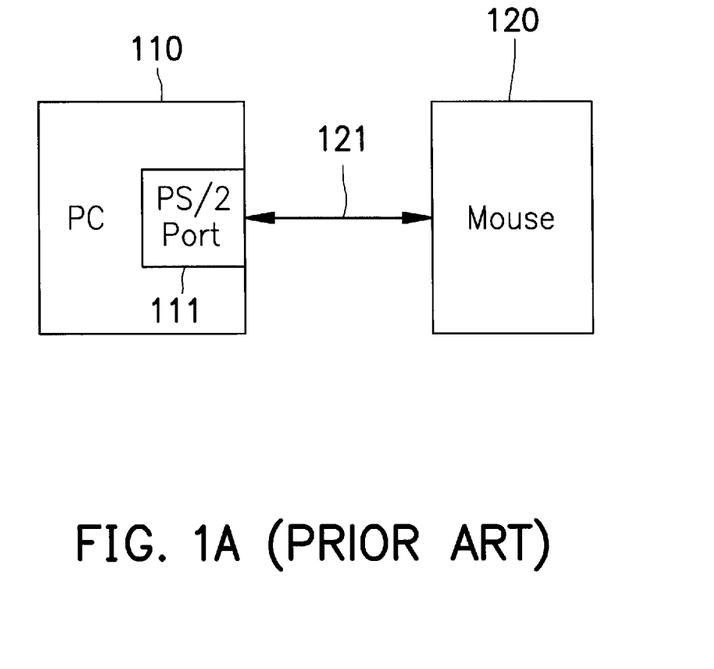
FIG. 1A is a schematic block diagram used to depict the connection of a mouse to a PC via a PS/2 port.
Figure 1B:
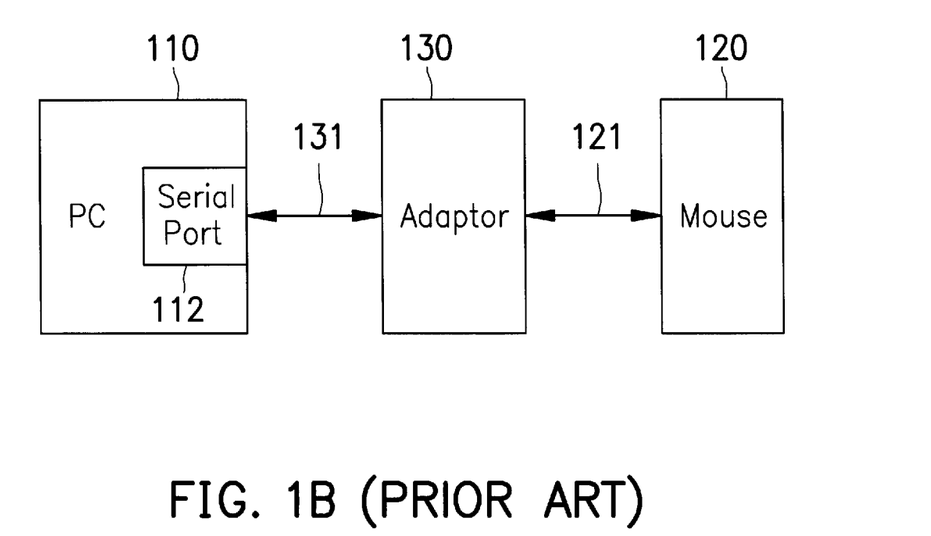
FIG. 1B is a schematic block diagram used to depict the connection of a mouse to a PC via a serial port with an adaptor.

FIGS. 1A–1B are schematic diagrams used to depict a conventional solution that allows a mouse to be connectable to a PC with either an RS-232 serial port or a PS/2 port. As shown in FIG. 1A, assume the mouse 120 is PS/2-compliant, i.e., which is specifically designed for direct connection via a PS/2 port 111 to a PC 110. In this case, the mouse cable 121 can be directly connected between the mouse 120 and the PS/2 port 111.

When it is desired to connect the mouse 120 to a PC 110 with an RS-232 serial port 112, an adapter 130 is used to connect between the mouse circuit 120 and the RS-232 serial port 112. In this case, a first cable 121 is used to connect the mouse 120 to the adapter 130, and then a second cable 131 is used to connect the adapter 130 to the RS-232 serial port 112. The adapter 130 is designed in such a manner that it can convert the PS/2-compliant mouse data from the mouse 120 into RS-232-compliant format so that the mouse data from the mouse 120 can be accepted by the RS-232 serial port 112.

The foregoing example of FIGS. 1A–1B depicts a PS/2-compliant mouse which can be connected via an adapter to an RS-232 serial port. The adapter can be also designed to connect an RS-232-compliant mouse to a PS/2 port.

The foregoing solution, however, would not be universally usable on all the various makes of PCs. This problem arises from the fact that different manufacturers may use the undefined pins in the connecting port in different manners. For instance, there are two NC (No Connect) pins in the PS/2 port connector. In some PCs, these NC pins may be connected to the ground or used for the output of a periodic pulse train; while in some other PCs, these NC pins may be used for transmission of some other predefined signals. Therefore, the scheme of using the adapter 130 shown in FIGS. 1A–1B may allow the mouse to be connectable to some makes of PCs, but not universally to all makes.

Moreover, some notebook computers may be designed in such a manner that the output currents from the serial port are reduced in magnitude for the purpose of reducing power consumption. Since the power to drive mouse is typically fetched from the PC, the foregoing scheme would restrict the serial port to be used by some types of mouse devices that require large current to operate.

In conclusion, conventional mouse devices have the following drawbacks in utilization.

(1) First, conventional mouse devices can be connected to one type of connecting port only, either the RS-232 serial port or the PS/2 port, but not both. When purchasing a new mouse, the user needs to know which type of connecting port his/her PC supports. A wrong type of mouse can be purchased if the user is unaware of such distinctions.

(2) Second, conventional mouse converters would not allow the mouse to be universally usable on various makes of PCs.

(3) Third, conventional mouse devices that require large current to operate may not be usable on some notebook computers that supply a low current from the serial port.

SUMMARY OF THE INVENTION

It is therefore an objective of the present invention to provide a mouse interface converter, which allows the mouse to be connectable to a PC installed with either an RS-232 serial port or a PS/2 port.

It is another objective of the present invention to provide a mouse interface converter, which allows the mouse to be compatible with various makes of PCs.

It is still another objective of the present invention to provide a mouse interface converter, which is low in power consumption so that it is suitable for use on portable computers.

In accordance with the foregoing and other objectives of the present invention, a mouse interface converter is provided. The mouse interface converter is designed for use on a mouse to allow the mouse to be connectable to a PC installed with either a serial port or a PS/2 port. The mouse includes a control circuit capable of converting mouse data into either RS-232 format or PS/2 format depending on the logic state of a mode-indicating signal that is input to a mode port thereof. The mouse interface converter comprises: a mode-detection circuit, a driving circuit, and an adapter.

The mode-detection circuit is designed to detect the voltage status of the connected port to thereby generate a mode-indicating signal indicative of whether the mouse is currently being connected to RS-232 serial port or PS/2 port; the mode-indicating signal being input to the mode port of the control circuit. The driving circuit is provided with an RxD/NC port and a TxD/NC port respectively connected to, when the mouse is connected to RS-232 serial port, the RxD signal line and TxD signal line of the RS-232 serial port, which is capable of pulling the RxD signal line of the RS-232 serial port to high-voltage logic state when a high-voltage logic state appears in the output data from the DATA port of the control circuit, and pulling down the voltage state of the RxD signal line of the RS-232 serial port to equal to the voltage state of the TxD signal line when a low-voltage logic state appears in the output data from the DATA port of the control circuit.

The adaptor is designed for coupling the mouse circuit to the RS-232 serial port in such a manner that the RxD/NC port of the driving circuit is connected directly to the RxD signal line of the RS-232 serial port, the TxD/NC port of the driving circuit is connected directly to the TxD signal line of the RS-232 serial port, and the system voltage input port takes on the voltage state at the DTR signal line and RTS signal line of the RS-232 serial port.

When the mouse is connected to PS/2 port, the DATA port of the control circuit is directly connected to the data input port of the PS/2 port, the system voltage input port of the mouse is connected to a voltage signal line of the PS/2 port, the RxD/NC port of the driving circuit is connected to a first NC signal line of the PS/2 port, and the TxD/NC port of the driving circuit is connected a second NC signal line of the PS/2 port.

When the mouse is connected via the adaptor to RS-232 serial port, the clock input port of the mouse is connected to the RTS signal line of the RS-232 serial port; the system voltage input port of the mouse is connected to the DTR signal line and the RTS signal line of the RS-232 serial port; the RxD/NC port of the driving circuit is connected to the RxD signal line of the RS-232 serial port; and the TxD/NC port of the driving circuit is connected to the TxD signal line of the RS-232 serial port.

In preferred embodiment of the invention, the mode-detection circuit comprises: a first resistor having a first end connected to a system voltage and a second end connected to a common node; a second resistor which is greater in resistance than the first resistor, and which has a first end connected to the common node connected to the first resistor and a second end connected to a signal line; the signal line being connected to an NC signal line when the mouse is coupled to PS/2 port and to a TxD signal line when coupled to RS-232 serial port; and a third resistor which is equal in resistance to the first resistor, and which has a first end connected to the common node connected to the first resistor and the second resistor and a second end connected to the mode port of the control circuit.

The driving circuit comprises: a pull-up transistor having a control end connected to the DATA port of the control circuit, a first end connected to a system voltage, and a second end connected to a common node; the pull-up transistor being switched into conducting state between the first and second end when the control end thereof receives a high-voltage logic state in the output data from the DATA port of the control circuit; a pull-down transistor having a control end connected to the second end of the pull-up transistor, a first end connected to an RxD/NC port, and a second end connected to a TxD/NC port; when the mouse is coupled to RS-232 serial port, the TxD/NC port being connected to the TxD signal line of the RS-232 serial port; a resistor having a first end connected to the common node and a second end connected to the second end of the pull-down transistor; and a diode having a positive end connected to the common node and a negative end connected to the first end of the pull-down transistor.

The adaptor comprises: a first diode having a positive end connected to the DTR signal line of the RS-232 serial port and a negative end connected to the system voltage input port of the mouse; a second diode having a positive end connected to the RTS signal line of the RS-232 serial port and a negative end connected to the system voltage input port of the mouse; and a resistor having a first end connected to the RTS signal line of the RS-232 serial port and a second end connected to the clock signal input port of the mouse.

Moreover, the adapter further comprises: a Zener diode having a negative end connected to the system voltage input port of the mouse and a positive end connected to the ground, for maintaining the system voltage input port at a preset voltage level to drive the mouse.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 2:
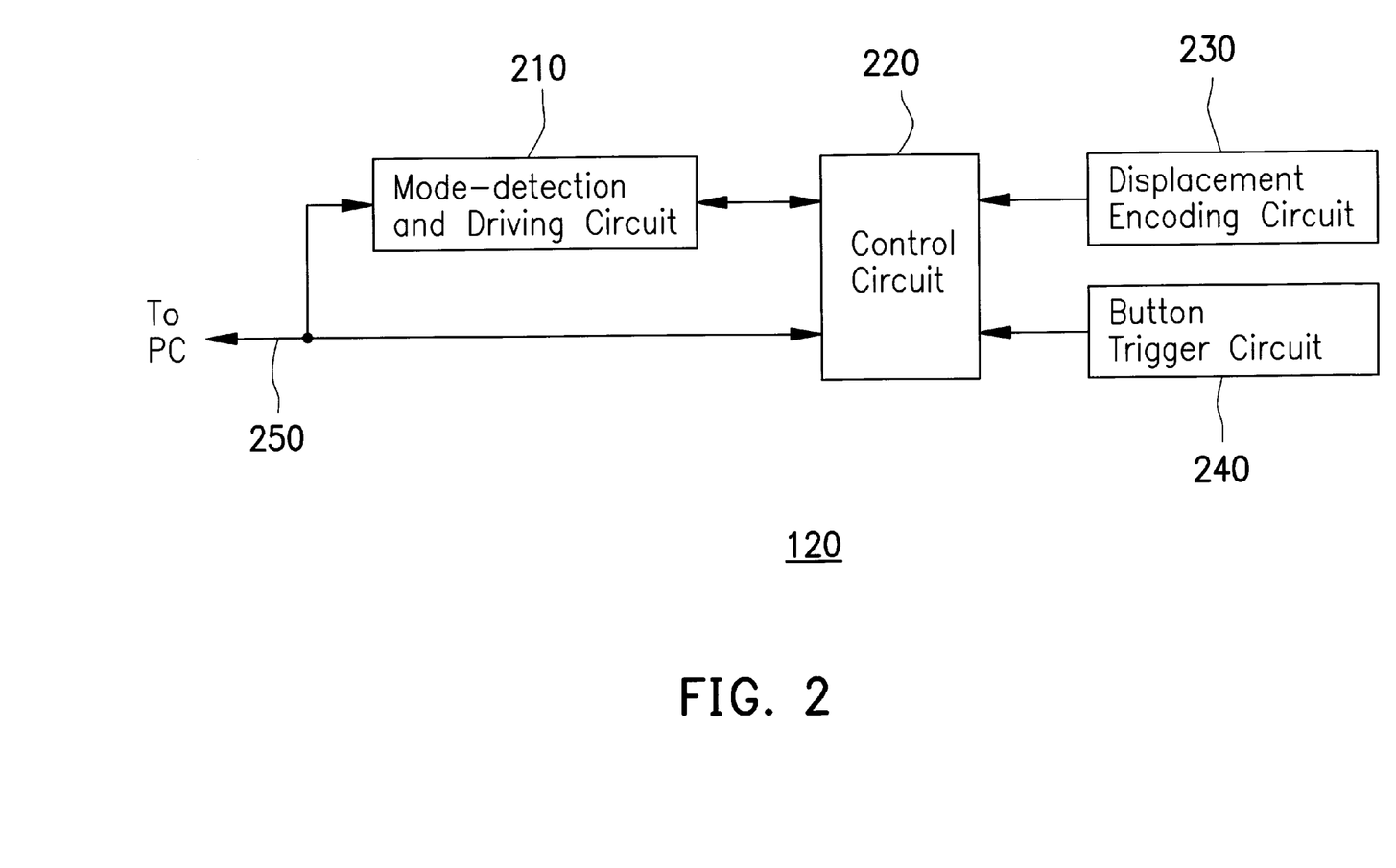
FIG. 2 is a schematic block diagram of the mouse interface converter according to the invention.

FIG. 2 is a schematic block diagram of the inside circuit structure of a mouse with the mouse interface converter according to the invention. As shown, the mouse circuit 120 includes a mode-detection and driving circuit 210, a control circuit 220, a displacement encoding circuit 230, and a button trigger circuit 240. The displacement encoding circuit 230 is used to encode the mouse movement and direction into a digital signal. The displacement encoding circuit 230 is a conventional circuit component in mouse, so the inside structure thereof will not be detailed in this specification. The button trigger circuit 240 is used to generate trigger signals in response to the click of the mouse button (not shown) by the user. The button trigger circuit 240 is also a conventional circuit component in mouse, so the inside structure thereof will also not be detailed in this specification. The control circuit 220 can convert the mouse data (i.e., both the output of the displacement encoding circuit 230 and the output of the button trigger circuit 240) to comply with the format of the currently connected port, i.e., either RS-232 serial port or PS/2 port, which is detected by the mode-detection and driving circuit 210, and then transfer the mouse data to the PC. The control circuit 220 is preferably implemented as a micro-controller on a single chip. The mode-detection and driving circuit 210 is capable of detecting which type of port is currently connected to the mouse, either RS-232 serial port or PS/2 port, to accordingly set the control circuit 220 to convert the mouse data from the displacement encoding circuit 230 and the button trigger circuit 240 to into the format of the currently connected port.

Figure 3:
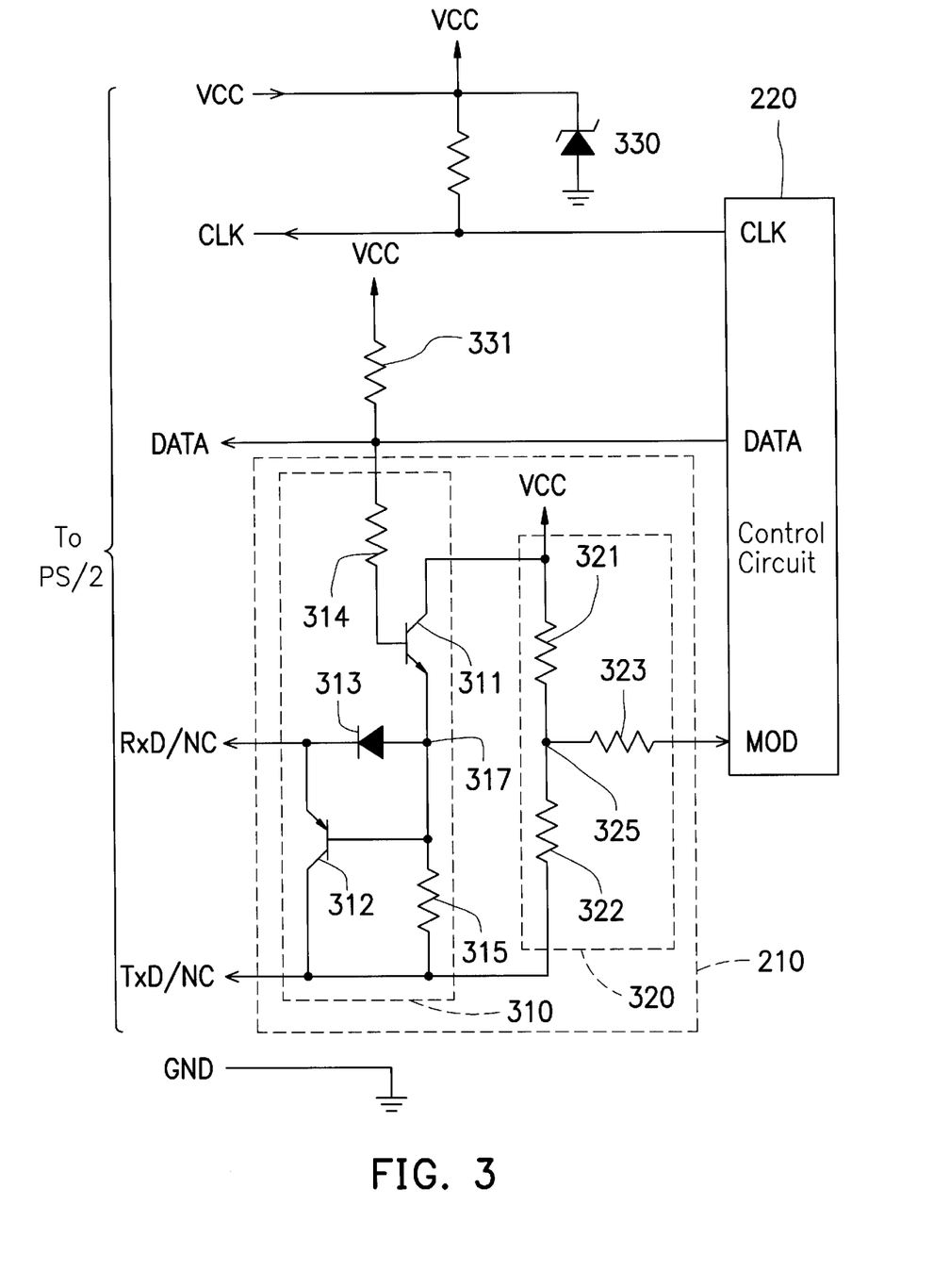
FIG. 3 is a schematic circuit diagram of the mode-detection and driving circuit utilized in the mouse interface converter of the invention.

FIG. 3 is a schematic circuit diagram of the mode-detection and driving circuit 210 and the control circuit 220 utilized in the mouse circuit 120 of FIG. 2. As shown, the mouse circuit 120 includes the signal ports VCC (system voltage), CLK (clock), DATA, RxD/NC, TxD/NC, and GND. When the mouse circuit 120 is connected via a PS/2 interface to the PC, the VCC, CLK, and DATA ports of the mouse circuit 120 are connected to the corresponding signal lines of the PS/2 interface; while the RxD/NC port is connected to one NC signal line of the PS/2 interface and the TxD/NC port is connected to the other NC signal line of the PS/2 interface (as mentioned earlier, the PS/2 port has at least two NC signal lines).

In the foregoing case, the PC can supply power to the mouse circuit 120 via the VCC signal line of the PS/2 port. Moreover, the control circuit 220 can supply clock signal and data via the CLK and DATA ports to the PC.

Figure 4:
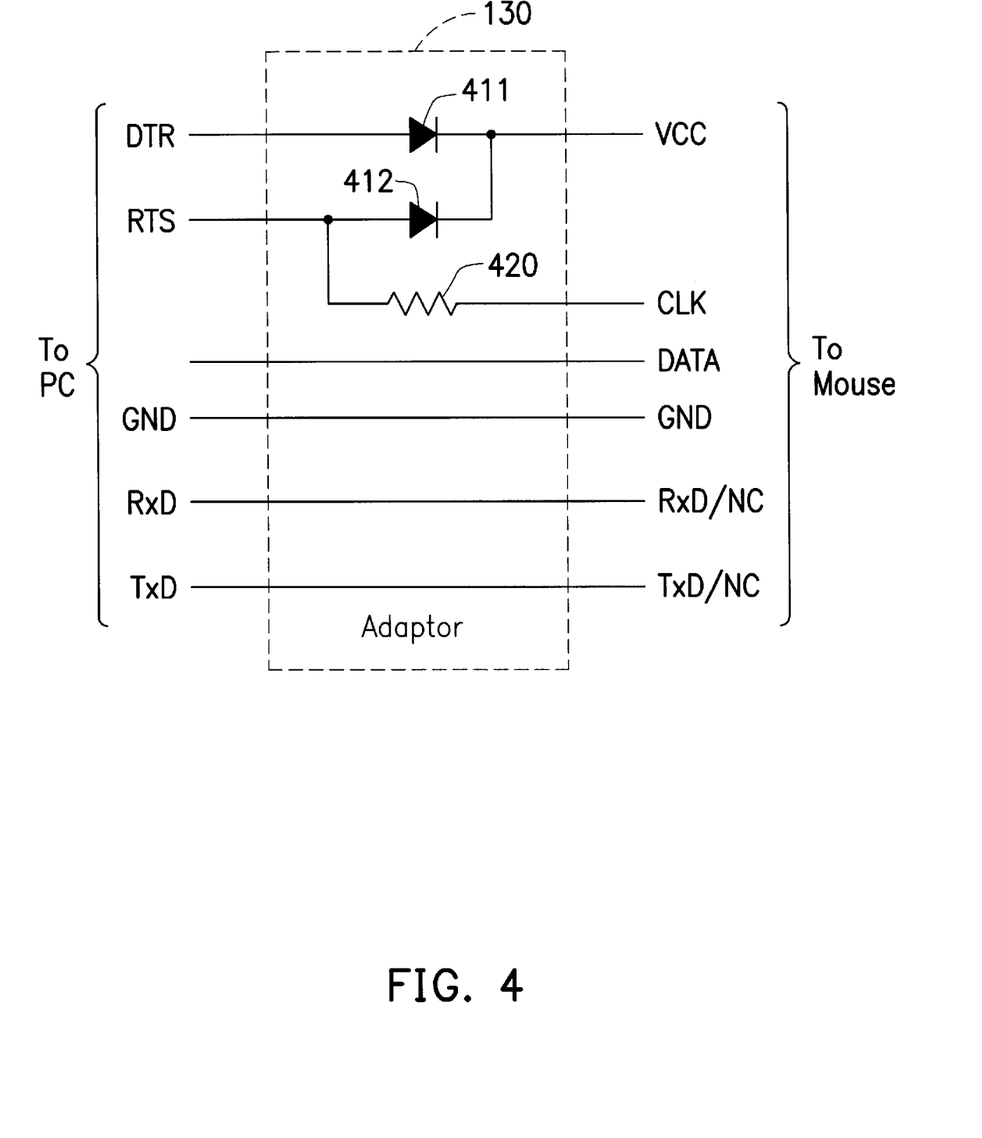
FIG. 4 is a schematic circuit diagram of the adaptor utilized in the mouse interface converter of the invention.

FIG. 4 is a schematic circuit diagram of the adapter 130 utilized in the mouse interface converter of the invention. This adapter 130 is specifically designed for connecting the mouse circuit 120 to RS-232 serial port.

As shown, the adapter 130 includes a first diode 411, a second diode 412, and a resistor 420. The left side of the adapter 130 (including the signal lines DTR, RTS, GND, RxD, and TxD) is coupled to the RS-232 serial port on the PC, while the right side of the same (including the signal lines VCC, CLK, GND, RxD/NC, and TxD/NC) is coupled to the mouse circuit 120.

Unlike the PS/2 port, the RS-232 serial port lacks a VCC signal line to supply power to the connected device. Therefore, in accordance with the invention, the DTR and RTS signals from the RS-232 serial port are used together to supply power to the mouse circuit 120. According to the RS-232 standard, the DTR and RTS signals are normally maintained constantly at 12 V (volt). Typically, the DTR signal alone can be utilized to provide the power needed by the mouse circuit 120. However, in the case of notebook computers where the DTR signal may be reduced in voltage level to save power, the DTR signal alone may provide inadequate power to the mouse. Therefore, as illustrated in FIG. 4, the VCC port of the mouse circuit 120 is connected via the first diode 411 to the DTR signal line of the RS-232 serial port and, in addition, via the second diode 412 to the RTS signal line of the same. The first and second diodes 411, 412 are used to restrict the flow of current in the backward direction from the mouse circuit 120 to the RS-232 serial port. Moreover, since the control circuit 220 typically operates at 5 V while both the DTR and RTS signals are typically set at 12 V, a Zener diode 330 (see FIG. 3) is connected between the VCC port and the ground so that the received 12 V voltage can be lowered and inhibited at 5 V.

In operation, the RTS signal can be used to reset the mouse. In accordance with the invention, the RTS signal line of the RS-232 serial port is connected via the resistor 420 to the CLK port of the mouse circuit 120. When the mouse circuit 120 is connected to PS/2 port, the CLK port thereof is used for signal output; whereas when connected to RS-232 serial port, the CLK port is used for signal input. The provision of the resistor 420 between the RTS signal line and the CLK port can help prevent the occurrence of data conflict when both the RTS signal line and the CLK port are used for signal output.

Besides, the GND, RxD/NC, and TxD/NC ports of the mouse circuit 120 are directly connected to the corresponding signal lines GND, RxD, and TxD signal lines of the RS-232 serial port. In operation, data will be transmitted uni-directionally from the mouse circuit 120 to the PC, and not from the PC to the mouse circuit 120.

When the mouse circuit 120 is connected via the adapter 130 to the RS-232 serial port on the PC, the DTR and RTS signal lines of the RS-232 serial port are used in combination to supply power via the first and second diodes 411, 412 to the VCC port of the mouse circuit 120. Moreover, the RTS signal line of the RS-232 serial port is connected via the resistor 420 to the CLK port of the mouse circuit 120; and the RxD and TxD signal lines are connected respectively to the RxD/NC and TxD/NC ports of the mouse circuit 120.

Referring back to FIG. 3, the mode-detection and driving circuit 210 is composed of two main parts: a mode-detection circuit (as the part enclosed within the dashed box indicated by the reference numeral 320) and a driving circuit (as the part enclosed within the dashed box indicated by the reference numeral 310). The mode-detection circuit 320 is composed of three resistors: a first resistor 321, a second resistor 322, and a third resistor 323. The first and third resistors 321, 323 are equal in resistance, and the second resistor 322 is larger in resistance than the first and the third resistors 321, 323. The TxD signal line of the RS-232 serial port, according to its definition, is maintained at 12 V when transmitting no data. As mentioned earlier, the 12 V is transformed by the Zener diode 330 to VCC=5 V for use to drive the mouse circuit 120. The voltage VCC is divided by the first and second resistors 321, 322 to obtain a mode-indicating signal at the node 325 therebetween. The mode-indicating signal is then transferred via the third resistor 323 to the MOD port of the control circuit 220.

When the mouse circuit 120 is connected to RS-232 serial port, the voltage at the node 325 (i.e., the mode-indicating signal) is below 0 V, which is taken as a low-voltage logic signal, i.e., a logic state of 0. This logic signal is then transferred via the third resistor 323 to the MOD port of the control circuit 220, causing the control circuit 220 to operate in RS-232 mode to convert the mouse data from the displacement encoding circuit 230 and button trigger circuit 240 into RS-232-compliant format and then transfer these data via the DATA port to the RS-232 serial port on the PC.

On the other hand, when the mouse circuit 120 is connected to PS/2 port, the voltage at the node 325 will be raised to VCC since in this case, the RxD/NC port of the mouse circuit 120 is connected to the NC signal line of the PS/2 port. The state of the voltage at the node 325 being VCC is taken as a high-voltage logic signal, i.e., a logic state of 1. This logic signal is then transferred via the third resistor 323 to the MOD port of the control circuit 220, causing the control circuit 220 to operate in PS/2 port mode to convert the mouse data from the displacement encoding circuit 230 and button trigger circuit 240 into PS/2-compliant format and then transfer these data via the DATA port to the PS/2 port on the PC.

In the case of all the NC signal lines of the PS/2 port are not connected, the second resistor 322 can be instead short-circuited while nonetheless allowing the MOD function of the control circuit 220 to work. However, in some makes of PCs, the NC signal lines are grounded. In this case, the scheme of replacing the second resistor 322 with a short-circuit will cause the mode-indicating signal to the MOD port of the control circuit 220 at a wrong logic state of 0 when a PS/2 port is connected.

To solve the foregoing problem, the second resistor 322 is designed in such a manner as to be greater in resistance than the first resistor 321. Assume the second resistor 322 is twice in resistance than the first resistor 321, then in the case that all the NC signal lines of the PS/2 port are connected to the ground, the voltage at the node 325 will be 3.3 V, which will be still taken as a logic signal of 1. This will then cause the control circuit 220 to switch to the PS/2 mode.

In still some other makes of PCs, the NC signal lines of the PS/2 port may be used for the output of a periodic pulse train, typically a pulse train of 5 ms (millisecond) in period and 300 μs (microsecond) in pulse width. In this case, the provision of the second resistor 322 can help prevent wrong judgment by the control circuit 220.

The other circuit part of the mode-detection and driving circuit 210, i.e., the driving circuit 310, is used to drive the output of the signals RxD/NC and TxD/NC. As shown in FIG. 3, the driving circuit 310 is composed of a pull-up transistor 311, a pull-down transistor 312, a diode 313, a fourth resistor 314, and a fifth resistor 315. In this embodiment, the pull-up transistor 311 is an NPN BJT (bipolar junction transistor), and the pull-down transistor 312 is a PNP BJT. When the mouse circuit 120 is connected to RS-232 serial port, the mouse circuit 120 will transmit data to the PC via the RxD/NC port. When transmitting no data, the RxD/NC port is maintained constantly at –12 V. In accordance with the invention, when a low-voltage logic state appears in the output data from the DATA port of the control circuit 220, it causes the pull-up transistor 311 to be switched to non-conducting state. As a result, the base voltage at the pull-down transistor 312 is pulled down via the fifth resistor 315 to equal to the –12 V voltage level at the TxD/NC port, thus causing the pull-down transistor 312 to be switched to conducting state.

When a high-voltage logic state appears in the output data, it will switch the pull-up transistor 311 into conducting state, thereby causing the node 317 to take on VCC (a high-voltage logic state) via the resistors 331, 314, which further causes the pull-down transistor 312 to be switched to non-conducting state. Under the conducting state, the pull-up transistor 311 will output current from its emitter to the node 317, and this current will subsequently flow through the diode 313 to the RxD/NC port, thus putting the RxD/NC port at high-voltage logic state. The diode 313 is arranged forwardly from the node 317 to the RxD/NC port so as to prevent any external current, in the event that a wrong connector is connected, to flow into the mouse circuit 120.

On the other hand, when a low-voltage logic state appears in the output data from the DATA port of the control circuit 220, it will cause the pull-up transistor 311 to be switched into non-conducting state. As a result, the node 317 will take on the –12V at TxD/NC port via the fifth resistor 315, causing the pull-down transistor 312 to be switched to conducting state, thereby further causing the RxD/NC port to take on the –12 V from the TxD/NC port.

Therefore, the output data from the DATA port of the control circuit 220 can switch on and off the pull-up transistor 311 and pull-down transistor 312 in the driving circuit 310, with the two transistors 311, 312 being mutually exclusive in conducting state. When either of the two transistors 311, 312 is switched on, it effectively provides a short-circuit that can provide currents to the TxD/NC port and the RxD/NC port. As a result, no additional driving currents are required. This feature allows the mouse circuit to consume less power as compared to the prior art.

In the foregoing preferred embodiment, the two transistors 311, 312 are BJTs; however, other types of switching elements, such as PMOS FET and NMOS FET (P-type and N-type metal-oxide semiconductor field effect transistors) can be used instead.

Moreover, the pull-up transistor 311 can be PNP instead of NPN. In this case, the output data from the DATA port of the control circuit 220 should be inverted in phase. However, the pull-up transistor 311 is preferably the PNP type for the reason of assuring compatibility with most makes of PCs, particularly with PCs with PS/2 port. This is because that these PCs will continually check the status of the NC signal lines of the PS/2 port to see whether the signals thereon are complied with the standard. The pull-up transistor 311 is therefore preferably the PNP type, so that the base thereof can be pulled up to VCC via the fourth resistor 314 and the resistor 331. When the pull-up transistor 311 is switched on, it can pull up the RxD/NC port to a high-voltage logic state, allowing the mouse circuit 120 to work with this particular type of PCs with PS/2 port.

From the foregoing description, it can be learned that the mouse interface converter of the invention is characterized in that it can allow the mouse to be connectable to a PC installed with either an RS-232 serial port or a PS/2 port. It can automatically detect which type of port is being connected to the mouse to thereby set the control circuit to convert the mouse data to the corresponding format.

In conclusion, the mouse interface converter of the invention has the following advantages over the prior art.

(1) First, the invention allows the mouse to be connectable to a PC installed with either an RS-232 serial port or a PS/2 port, thus ensuring that the mouse would be compatible with many various makes of PCs that come with either an RS-232 serial port or a PS/2 port.

(2) Second, the invention is well considered to suit the mouse interface converter with various designs of PCs, thus further ensuring that the mouse would be compatible with many various makes of PCs.

(3) Third, the invention allows the mouse to consume less power that allows it to be suitable for use on notebook computers where power saving is the primary concern. When the mouse is connected to RS-232 serial port, the use of two diodes to fetch power from the RS-232 serial port can provide sufficient power to drive the mouse. Therefore, the mouse provided with the mouse interface converter of the invention can be connectable to either RS-232 serial port or PS/2 port.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. In a mouse, a mode-detection circuit capable of detecting whether the mouse is currently being connected to an RS-232 serial port or a PS/2 port, the mouse having a control circuit capable of converting mouse data into either RS-232 format or PS/2 format depending on the logic state at a mode port thereof; the mode-detection circuit comprising:

a first resistor having a first end connected to a system voltage and a second end connected to a common node;

a second resistor which is greater in resistance than the first resistor, and which has a first end connected to the common node connected to the first resistor and a second end connected to a signal line; the signal line being connected to an NC signal line when the mouse is coupled to PS/2 port and to a TxD signal line when coupled to RS-232 serial port; and a third resistor which is equal in resistance to the first resistor, and which has a first end connected to the common node connected to the first resistor and the second resistor and a second end connected to the mode port of the control circuit;

wherein when the mouse is coupled to PS/2 port, the mode-indicating signal obtained from the common node is at high-voltage logic state, causing the control circuit to convert the mouse data into PS/2 format; and when the mouse is coupled to RS-232 serial port, the mode-indicating signal obtained from the common node is at low-voltage logic state, causing the control circuit to convert the mouse data into RS-232 format.

2. In a mouse, a driving circuit capable of driving the mouse when the mouse is currently being connected to an RS-232 serial port; the mouse having a control circuit having a DATA port for outputting the mouse data to the RS-232 serial port; the driving circuit comprising:

a pull-up transistor having a control end connected to the DATA port of the control circuit, a first end connected to a system voltage, and a second end connected to a common node; the pull-up transistor being switched into conducting state between the first and second end when the control end thereof receives a high-voltage logic state in the output data from the DATA port of the control circuit;

a pull-down transistor having a control end connected to the second end of the pull-up transistor, a first end connected to an RxD/NC port, and a second end connected to a TxD/NC port; when the mouse is coupled to RS-232 serial port, the TxD/NC port being connected to the TxD signal line of the RS-232 serial port;

a resistor having a first end connected to the common node and a second end connected to the second end of the pull-down transistor; and a diode having a positive end connected to the common node and a negative end connected to the first end of the pull-down transistor;

wherein when a high-voltage logic state appears in the output data from the DA-TA port of the control circuit, it causes the pull-up transistor to be switched into non-conducting state, thereby pulling the RxD signal line of the RS-232 serial port to high-voltage logic state via the diode and the RxD/NC port; and when a low-voltage logic state appears in the output data from the DATA port of the control circuit, it causes the pull-down transistor to be switched into conducting state, thereby pulling down the voltage state of the RxD signal line of the RS-232 serial port to equal to the voltage state of the TxD signal line.

3. The driving circuit of claim 2, wherein the pull-up transistor is an NPN BJT whose base is connected to receive the output data from the DATA port of the control circuit, whose collector is connected to the system voltage, and whose emitter is connected to the common node.

4. The driving circuit of claim 2, wherein the pull-down transistor is a PNP BJT whose base is connected to the common node, whose emitter is connected to the RxD/NC port, and whose collector is connected to the TxD/NC port.

5. In a mouse, an adaptor for the mouse, when connected to an RS-232 serial port, to fetch working current from the RS-232 serial port; the adaptor comprising:

a first diode having a positive end connected to the DTR signal line of the RS-232 serial port and a negative end connected to the system voltage input port of the mouse;

a second diode having a positive end connected to the RTS signal line of the RS-232 serial port and a negative end connected to the system voltage input port of the mouse; and a resistor having a first end connected to the RTS signal line of the RS-232 serial port and a second end connected to the clock signal input port of the mouse.

6. The adaptor of claim 5, further comprising:

a Zener diode having a negative end connected to the system voltage input port of the mouse and a positive end connected to the ground, for maintaining the system voltage input port at a preset voltage level to drive the mouse.

7. A mouse interface converter for use on a mouse to allow the mouse to be connectable to a PC with either a serial port or a PS/2 port, the mouse having a control circuit capable of converting mouse data into either RS-232 format or PS/2 format depending on the logic state at a mode port thereof; the mouse interface converter comprising:

a mode detection circuit for detecting the voltage status of the connected port to thereby generate a mode-indicating signal indicative of whether the mouse is currently being connected to RS-232 serial port or PS/2 port; the mode-indicating signal being input to the mode port of the control circuit;

a driving circuit having an RxD/NC port and a TxD/NC port respectively connected to, when the mouse is connected to RS-232 serial port, the RxD signal line and TxD signal line of the RS-232 serial port, which is capable of pulling the RxD signal line of the RS-232 serial port to high-voltage logic state when a high-voltage logic state appears in the output data from the DATA port of the control circuit, and pulling down the voltage state of the RxD signal line of the RS-232 serial port to equal to the voltage state of the TxD signal line when a low-voltage logic state appears in the output data from the DATA port of the control circuit;

an adaptor for coupling the control circuit, the mode-detection circuit, and the driving circuit to the RS-232 serial port in such a manner that the RxD/NC port of the driving circuit is connected directly to the RxD signal line of the RS-232 serial port, the TxD/NC port of the driving circuit is connected directly to the TxD signal line of the RS-232 serial port, and the system voltage input port takes on the voltage state at the DTR signal line and RTS signal line of the RS-232 serial port; wherein the adaptor comprises:
  a first diode having a positive end connected to the DTR signal line of the RS232 serial port and a negative end connected to the system voltage input port of the mouse;
  a second diode having a positive end connected to the RTS signal line of the RS232 serial port and a negative end connected to the system voltage input port of the mouse; and
  a resistor having a first end connected to the RTS signal line of the RS-232 serial port and a second end connected to the clock signal input port of the mouse;
when the mouse is connected to RS/2 port, the DATA port of the control circuit is directly connected to the data input port of the PS/2 port, the system voltage input port of the mouse is connected to a voltage signal line of the PS/2 port, the RxD/NC port of the driving circuit is connected to a first NC signal line of the PS/2 port, and the TxD/NC port of the driving circuit is connected a second NC signal lne of the PS/2 port; and
when the mouse is connected via the adaptor to RS-232 serial port, the clock input port of the mouse is connected to the RTS signal line of the RS-232 serial port; the system voltage input port of the mouse is connected to the DTR signal line and the RTS signal line of the RS-232 serial port; the RxD/NC port of the driving circuit is connected to the RxD signal line of the RS-232 serial port; and the TxD/NC port of the driving circuit is connected to the TxD signal line of the RS-232 serial port.

8. The mouse interface converter of claim 7, wherein the mode-detection circuit comprises:
  a first resistor having a first end connected to a system voltage and a second end connected to a common node;
  a second resistor which is greater in resistance than the first resistor, and which has a first end connected to the common node connected to the first resistor and a second end connected to a signal line; the signal line being connected to an NC signal line when the mouse is coupled to PS/2 port and to a TxD signal line when coupled to RS-232 serial port; and
  a third resistor which is equal in resistance to the first resistor, and which has a first end connected to the common node connected to the first resistor and the second resistor and a second end connected to the mode port of the control circuit.

9. The mouse interface converter of claim 7, wherein the driving circuit comprises:
  a pull-up transistor having a control end connected to the DATA port of the control circuit, a first end connected to a system voltage, and a second end connected to a common node; the pull-up transistor being switched into conducting state between the first and second end when the control end thereof receives a high-voltage logic state in the output data from the DATA port of the control circuit;
  a pull-down transistor having a control end connected to the second end of the pull-up transistor, a first end connected to an RxD/NC port, and a second end connected to a TxD/NC port; when the mouse is coupled to RS-232 serial port, the TxD/NC port being connected to the TxD signal line of the RS-232 serial port;
  a resistor having a first end connected to the common node and a second end connected to the second end of the pull-down transistor; and
  a diode having a positive end connected to the common node and a negative end connected to the first end of the pull-down transistor.

10. The mouse interface converter of claim 7, wherein the adapter further comprises:
  a Zener diode having a negative end connected to the system voltage input port of the mouse and a positive end connected to the ground, for maintaining the system voltage input port at a preset voltage level to drive the mouse.

11. A mouse interface converter for use on a mouse to allow the mouse to be connectable to a PC with either a serial port or a PS/2 port, the mouse having a control circuit capable of converting mouse data into either RS-232 format or PS/2 format depending on the logic state at a mode port thereof; the mouse interface converter comprising:
  a mode-detection circuit for detecting the voltage status of the connected port to thereby generate a mode-indicating signal indicative of whether the mouse is currently being connected to RS-232 serial port or PS/2 port; the mode-indicating signal being input to the mode port of the control circuit; the mode-detection circuit including:
    a driving circuit having an RxD/NC port and a TxD/NC port respectively connected to, when the mouse is connected to RS-232 serial port, the RxD signal line and TxD signal line of the RS-232 serial port, which is capable of pulling the RxD signal line of the RS-232 serial port to high-voltage logic state when a high-voltage logic state appears in the output data from the DATA port of the control circuit, and pulling down the voltage state of the RxD signal line of the RS-232 serial port to equal to the voltage state of the TxD signal line when a low-voltage logic state appears in the output data from the DATA port of the control circuit; and
  an adaptor for coupling the control circuit, the mode-detection circuit, and the driving circuit to the RS-232 serial port in such a manner that the RxD/NC port of the driving circuit is connected directly to the RxD signal line of the RS-232 serial port, the TxD/NC port of the driving circuit is connected directly to the TxD signal line of the RS-232 serial port, and the system voltage input port takes on the voltage state at the DTR signal line and RTS signal line of the RS-232 serial port;
  wherein
    the mode-detection circuit includes:
      a first resistor having a first end connected to a system voltage and a second end connected to a common node;
      a second resistor which is greater in resistance than the first resistor, and which has a first end connected to the common node connected to the first resistor and a second end connected to a signal line; the signal line being connected to an NC signal line when the mouse is coupled to PS/2 port and to a TxD signal line when coupled to RS-232 serial port; and
      a third resistor which is equal in resistance to the first resistor, and which has a first end connected to the common node connected to the first resistor and the second resistor and a second end connected to the mode port of the control circuit;

wherein
    the driving circuit includes:
        a pull-up transistor having a control end connected to the DATA port of the control circuit, a first end connected to a system voltage, and a second end connected to a common node; the pull-up transistor being switched into conducting state between the first and second end when the control end thereof receives a high-voltage logic state in the output data from the DATA port of the control circuit;
        a pull-down transistor having a control end connected to the second end of the pull-up transistor, a first end connected to an RxD/NC port, and a second end connected to a TxD/NC port; when the mouse is coupled to RS-232 serial port, the TxD/NC port being connected to the TxD signal line of the RS-232 serial port;
        a resistor having a first end connected to the common node and a second end connected to the second end of the pull-down transistor; and
        a diode having a positive end connected to the common node and a negative end connected to the first end of the pull-down transistor;
wherein
    the adaptor includes:
        a first diode having a positive end connected to the DTR signal line of the RS-232 serial port and a negative end connected to the system voltage input port of the mouse;
        a second diode having a positive end connected to the RTS signal line of the RS-232 serial port and a negative end connected to the system voltage input port of the mouse; and
        a resistor having a first end connected to the RTS signal line of the RS-232 serial port and a second end connected to the clock signal input port of the mouse;
and wherein
    when the mouse is connected to PS/2 port, the DATA port of the control circuit is directly connected to the data input port of the PS/2 port, the system voltage input port of the mouse is connected to a voltage signal line of the PS/2 port, the RxD/NC port of the driving circuit is connected to a first NC signal line of the PS/2 port, and the TxD/NC port of the driving circuit is connected a second NC signal line of the PS/2 port; and
    when the mouse is connected via the adaptor to RS-232 serial port, the clock input port of the mouse is connected to the RTS signal line of the RS-232 serial port; the system voltage input port of the mouse is connected to the DTR signal line and the RTS signal line of the RS-232 serial port; the RxD/NC port of the driving circuit is connected to the RxD signal line of the RS-232 serial port; and the TxD/NC port of the driving circuit is connected to the TxD signal line of the RS-232 serial port.

12. The mouse interface converter of claim 1, further comprising:
    a ground port which, when the mouse is connected to PS/2 port, is connected to the GND signal line of the PS/2 port; and when the mouse is connected to RS-232 serial port, is connected to the GND signal line of the RS-232 serial port.

13. The mouse interface converter of claim 2, further comprising:
    a Zener diode having a negative end connected to the system voltage input port of the mouse and a positive end connected to the ground, for maintaining the system voltage input port at a preset voltage level to drive the mouse.

* * * * *